…

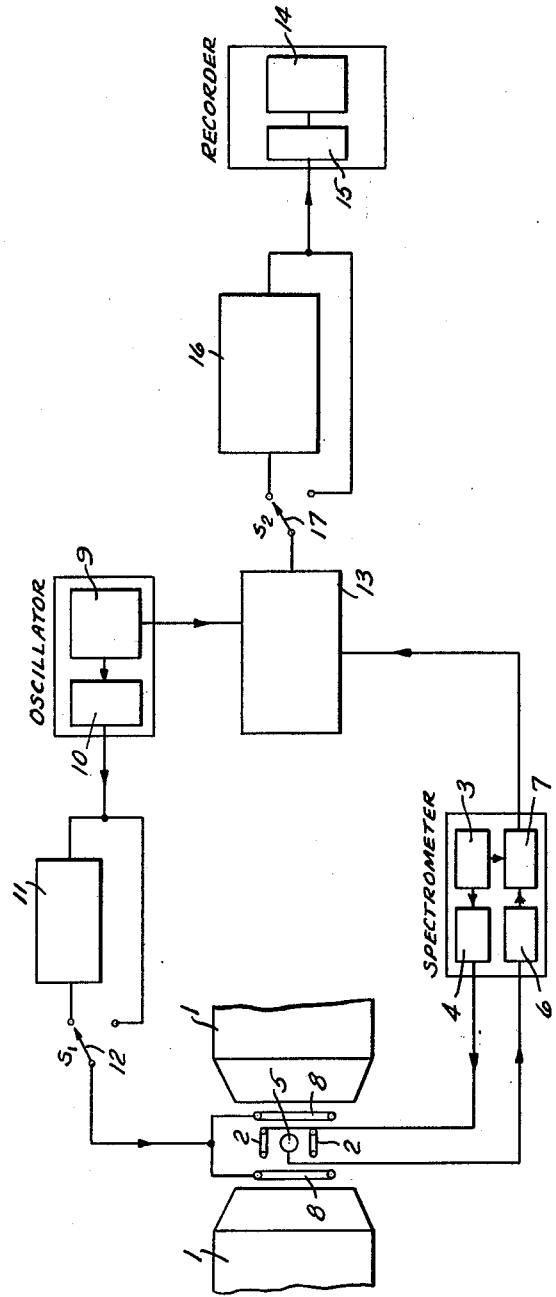

United States Patent Office 3,124,741
Patented Mar. 10, 1964

3,124,741
DEVICE FOR RECORDING OF NUCLEAR INDUCTION SPECTRA
Johann Jaroslav Primas, Zurich, Switzerland, assignor to Trub, Tauber & Co. A.G., Zurich, Switzerland
Filed Apr. 27, 1962, Ser. No. 190,748
1 Claim. (Cl. 324—.5)

The present invention relates to a method and device for recording nuclear induction spectra by the resonance method and is more particularly concerned with a device operating by the modulation sideband method. In particular, the present invention is concerned with a method and a device based on said method able to effect the direct recording of absorption signals and dispersion signals, especially in the field of nuclear induction spectroscopy of high resolution.

This is a continuation-in-part of my application Serial No. 762,071, filed September 19, 1958.

For the recording of nuclear resonance spectra by the steady-state measurement method, there are known essentially the following methods:

(a) Static method
(b) Modulation scanning method
(c) Modulation sideband method

For experimental reasons, practically in all cases a high frequency field $B_1$ of constant frequency $\omega_0$ and a variable magnetic field $B_0$ $(t)$ are used. In the modulation methods (b) and (c), the magnetic field is customarily modulated sinusoidally, so that the relation for $B_0$ $(t)$ is, $$\Delta\omega(t) = (\gamma)B_0(t) - \omega_0 = \overline{\omega} + \omega_M \cos \Omega t \qquad (1)$$

wherein $\gamma$ is the gyromagnetic ratio of the atom nuclei investigated, $\Omega$ is the modulation frequency in radians and $\omega_M$ is the modulation amplitude measured in frequencies $(\omega_M = |\gamma|B_M)$. Thus, $\Delta\omega(t)$ is the difference between the actual field $(\gamma)$. $B_0(t)$ and the resonance field $\omega_0$, expressed in frequency units, and $\overline{\omega}$ is the difference between the average value in time) of the actual field and the resonance field, in frequency units. A measurement method is termed a steady state method if $d\overline{\omega}/dt \ll \omega_2^2$, wherein $T_2$ is Bloch's relaxation time, $T_2$ of the nuclei investigated. The static method is a steady state measuring method which employs no modulation ($\omega_M=0$) and it has the disadvantage that certain disturbing effects such as varying leakage voltages (direct cross-talk from high frequency transmitter to receiver) impair the signal to noise ratio of a nuclear resonance spectrum. The modulation scanning method customary in nuclear resonance spectroscopy of small resolution avoids this disadvantage and employs a modulation frequency and modulation amplitude which are small as compared with $\omega_2(\omega_M \ll \omega_2, \Omega \ll \omega_2)$. When using a lock-in amplifier which is tuned to the frequency $\Omega$, the derivation of the nuclear resonance signal is obtained directly. This measurement method can scarcely be employed in nuclear resonance spectroscopy of high resolution since it is extremely inconvenient for experimental reasons to employ the very small modulation frequencies necessary in this connection (for instance in the case of a resolution of $10^{-8}$ at a frequency of 25 megacycles, the modulation frequency should in no case exceed 0.1 cycle). Furthermore, in spectrographs of highest resolution power, the resolution possible is generally determined by the magnetic field which varies stochastically in time. By this stochastically varying magnetic field, there is obtained a signal error which cannot be brought as close as desired to the theoretically possible minimum through the modulation scanning method, since the error caused by the varying magnetic field is always substantially greater.

For these reasons, in practically all cases only the static method has been employed up to the present time in the case of very high resolutions. Even in the case of the static method, the leakage difficulties can be eliminated extensively by suitable construction of the measurement head, however an analysis of spectra, which were obtained in routine operation without special precautionary measures, shows that the noise spectrum is not white, but rather at low temperatures rises considerably above the level of the Johnson noise.

By the modulation sideband method, this additional noise can be completely eliminated at the low frequencies which originate essentially from leakage variations and the like, in which connection the disadvantages which the modulation scanning has in case of high resolutions are avoided. In contradistinction to the modulation scanning method, the sideband method employs a modulation frequency which is greater than the extent of the entire line complex and in particular much larger than the line width $2\omega_2$ of an individual line.

It is, therefore, an object of the present invention to provide a modulation sideband method for recording nuclear induction spectra, in which the elimination of the noise present at very low frequencies is made possible, and an absolute zero-point constant is obtained, enabling the use of electronic integrators in structure analysis of molecules.

Another object of this invention is to solve the general Bloch-equations for any desired modulation amplitude of the $B_0$-field and for any desired magnitude of the $B_1$-field.

A further object of this invention is to provide a device for recording nuclear induction spectra by the modulation sideband method.

Still another object of this invention is to provide a device for recording nuclear induction spectra, wherein between the transmitter and the coils producing the modulation field, there may be inserted an attenuator, the purpose of which is to increase to a maximum the signal/noise ratio.

Still another object of the present invention is to provide a device for recording nuclear absorption spectra, which may be electronically integrated.

A better understanding of the invention may be obtained from the following description given in connection with the accompanying drawings, in which:

FIGURE 2 is a block diagram representing device for recording nuclear induction spectra according to the invention.

Figure 1:
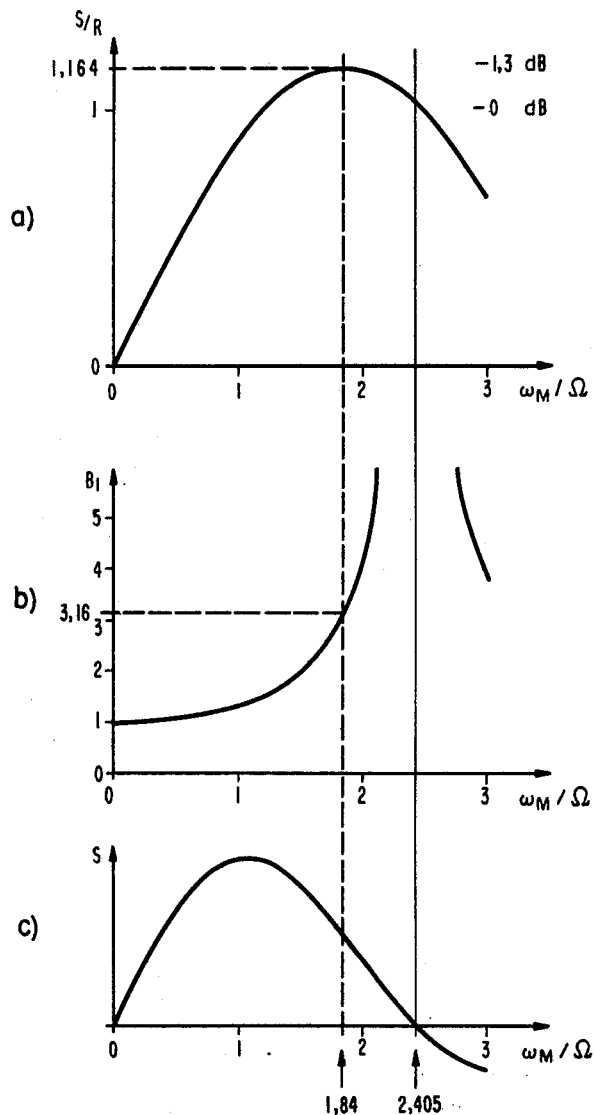
FIGURE 1 is a family of curves showing (a) the relative modulation amplitude, (b) the relation between the high frequency amplitude and the relative modulation amplitude, and (c) the value of the modulation amplitude, determinable independently of the saturation.

The question of the optimum selection of the modulation amplitude will now be discussed, as integrant part of the present invention, in which connection there will be selected as optimum criterion the signal/noise ratio at a given but still permissible saturation of the nuclear resonance line through the amplitude $B_1$ of the applied R.F. field.

*Solution of the Bloch Equation for High Modulation Frequencies With Any Desired Modulation Amplitude and Any Desired $B_1$-Field*

The modulation sideband method is based on the well-known modulation effects in nuclear induction as repeatedly discussed in the literature, and was also proposed as substitute for the modulation scanning method for investigations at high resolution. However, this method has never heretofore been used for the present purpose (elimination of noise and drift, caused by leakage variations), nor is there available in the literature a sufficiently general solution of the Bloch equation which would permit a discussion of the signal-noise ratio and optimum dimensioning. The amplitude modulation of the $B_0$-field was already treated as equivalent to a frequency modulation of the $B_1$-field which however, as can be noted from the Bloch equation, is in general not permissible and gives results which are only qualitatively correct. For this reason, the general solutions of the Bloch equations have been derived and solved for high modulation frequencies (i.e., $\Omega \gg \omega_2$), for any desired modulation amplitudes $\omega_M$ and any desired $B_1$-field. For small $B_1$-fields, as customary in nuclear induction spectrometry of high resolution, they give the following special solution for the modulated signal:

$$G(t) \sin \Omega t = 2iJ_1(\omega_M/\Omega)|\gamma|\overline{B}_1 M_0(\overline{\omega}+i\omega)^{-1}\{1-(\gamma\overline{B}_1)^2 (\omega_2/\omega_1)(\omega_2{}^2+\overline{\omega}^2)^{-1}+0(\gamma\overline{B}_1)^4\} \quad (2)$$

with $$\overline{B}_1 = B_1 J_0(\omega_M/\Omega) \quad (3)$$

For the stationary method ($\omega_M = 0$) are obtained on the other hand $$H(\overline{\omega}) = -|\gamma|B_1 M_0(\omega_1+i\omega)^{-1}\{1-(\gamma B_1)^2(\omega_2/\omega_1)(\omega_2{}^2+\overline{\omega}^2)^{-1}+0(\gamma B_1)^4\} \quad (4)$$

In these equations:

$G(t)$ is the percentage of the first harmonic in the vicinity of the principal signal (i.e., the portion of the signal filtered out by the phase-sensitive rectifier)
$J_0 J_1$ are the zero and the first Bessel functions respectively
$i$ is the imaginary unit
$M_0$ is the Bloch initial magnetization
$\omega_2$ is a reciprocal of the Bloch relaxation time $T_2$
$\omega_1$ is the reciprocal of the Bloch relaxation time $T_1$
$\overline{\omega}$ is the Bloch penetration frequency
$H(\overline{\omega})$ is the signal in the steady state method A comparison of (2) with (3) shows that in the sideband modulation method, in the case of small $B_1$-fields, the same saturation conditions are present as in the case of the static method when the $B_1$-field in the modulation method is increased by the factor $1/J_0(\omega_M/\Omega)$. In the modulation method, in accordance with Equation 1, at a given small saturation degree, there is obtained a maximum signal value if $J_1(\omega_M/\Omega)$ is maximum; this is the case for $\omega_M/\Omega = 1.84$; in this connection $$\text{Max } J_1(x) = J_1(1.84) = 0.5819 \quad (5)$$

The real or imaginary part (depending on the experimental set-up) of the right hand side of Equations 2 and 4 directly represents the signal observed. Since an ideal phase-sensitive detector leaves the power spectrum of the noise unchanged except for displacement by the frequency $\Omega$, Equations 2 and 4 can be directly compared with each other in the case of additive white noise. In this connection, it results that in the case of white noise, the modulation method is slightly superior to the static method for the same saturation conditions, since with optimum dimensioning and with the same noise voltage, it gives a signal voltage which is higher by the factor 2 max $J_1 = 1.164$ (improvement of the signal/noise ratio by 1.3 db). If the noise spectrum is not white, but rises strongly at low frequencies, there is naturally obtained in addition in case of the customary use of a lowpass filter after the detector, in view of the transposition of the effective noise spectrum by the frequency $\Omega$, a considerable improvement in the signal/noise ratio which in practice can be increased to complete elimination of the noise of the very low frequencies.

The fact that the modulation method at the same weak saturation gives a signal/noise ratio which is larger by a small factor is at first surprising, but it is due to the fact that the saturation behavior in the modulation method is essentially different and more complicated than in the case of the static method and that only the behavior at small saturation which alone is of interest for spectroscopy of high resolution was compared.

As can be noted from Equations 2 and 3, the determination of the optimum modulation amplitude cannot be effected simply by varying the modulation amplitude and noting the value of the nuclear resonance signal since by the variation of the modulation amplitude, the $\overline{B}_1$-field of Equation 4 which is effective for the saturation is also changed and the signal value is thus also affected by the saturation. The optimum modulation amplitude can be determined very rapidly. From the derivation of Equation 2, it is clear that the principal line (used for this modulation method) disappears at the zero points of the Bessel functions $J_0$ and $J_1$. The first zero point is at $\omega_M/\Omega = 2.4048$ ($J(2.4048) = 0$). This zero point can be vary accurately determined by variation of the modulation amplitude, since at this point the nuclear resonance signal not only disappears, but also changes its sign. The value of the modulation field determined at this zero point can now easily be utilized as calibration for the setting of the optimum value of $\omega_M/\Omega = 1.84$.

In order to be able to describe the process even more precisely, the behavior of the principal spectrum was recorded in FIG. 1 in accordance with the above calculations. The curves represent the following functions:

FIG. 1a shows the signal/noise ratio $S/R$ as a function of the relative modulation amplitude $\omega_M/\Omega$, wherein $\omega_M$ is the amplitude expressed in frequency units and $\Omega$ is the frequency of the modulation field. (The amplitude in field strength units is $\omega_M/\Omega$. The curve relates to constant saturation. It is calculated in the following manner: At small saturation, the signal amplitude $S$ for the steady state method is calculated, and at the same saturation, the signal amplitude $S_0$ as a function of the relative modulation amplitude $\omega_N/\Omega$. The ratio $S/S_0$ is also a function of $\omega_M/\Omega$. It indicates by how many times the signal amplitude in the modulation method is greater or smaller than in the case of the steady state method. Since the white noise is transmitted unchanged, an $S$ and $S_0$ are therefore measured against the same noise level $S/S_0$ gives, a direct measurement of the change of the signal noise ratio $S/R$ upon passing from the steady state to the modulation method. The value selected is $$\frac{S}{S_0} = \frac{S}{R}; \frac{S}{R} = 1.164$$

which means that the signal noise ratio for the modulation method at the same saturation is 1.164 times better than in the case of the steady state method, assuming white noise. From FIG. 1a, it can be noted that this improvement is the optimum and is obtained at $$\frac{\omega_M}{\Omega} = 1.84$$

Since the white noise is transmitted unchanged, the signal/noise ratio in the sideband method is also better by this factor than in the steady state method.

Since however a proportion of the leakage variations considerably above the Johnson noise is present in the low frequency noise, this ratio is correspondingly improved, since upon the phase-sensitive rectification with the modulation frequency, this portion of the noise is eliminated.

FIG. 1b shows the ratio of the high frequency amplitudes $B_{1M}/B_1$ necessary to obtain the same degree of saturation. $B_1$ is the selected high frequency amplitude in the steady state method and $B_{1M}$ the high frequency method which gives the same saturation in the modulation method. This ratio is also a function of the modulation amplitude. With optimum modulation amplitude, the high frequency field $B_{1M}$ should be selected a factor of 3.16 higher than $B_1$ in the steady state method.

The procedure is therefore that first of all the saturation is determined in the well-known manner with the steady state method and thereupon the desired value of $B_1$ below the saturation is selected. Upon transfer to the sideband method, this field, by increasing the output of the R.F. transmitter or by regulating the setting of an attenuator, is increased by the factor 3.16. The optimum modulation amplitude must now be sought. This cannot be done by seeking the larger signal amplitude as a function of the modulation amplitude since the degree of saturation would also change with this and the curve in FIG. 1a would be displaced. It gives however the value of the modulation amplitude, determinable independently of the saturation, in which the principal spectrum just becomes zero. This value is at $$\frac{\omega_M}{\Omega} = 2.405$$

as shown in FIG. 1c. If, after this value has been found by varying the modulation amplitude by means of an attenuator or by varying the output of the modulation oscillator, the modulation amplitude is reduced by means of an attenuator by the factor 1.84/2.405, the condition for optimum signal/noise ratio is obtained and the spectrograph is set for operation.

The device necessary for this method of supplementing the known nuclear induction spectrometer of high resolution power is shown in the block diagram of FIG. 2. A magnet 1 is provided for producing a unidirectional magnetic field, the poles of said magnet having a pair of transmitter coils 2 placed therebetween, said coils being connected to a transmitter 3 through a first variable attenuator 4. A receiver coil 5 is mounted between the poles of the magnet 1 and is connected to a receiver 6, said receiver being connected to a first phase-sensitive detector 7. A pair of modulation coils 8, mounted between the magnet poles, is connected to a low frequency oscillator 9 through a second variable attenuator 10, the circuit between the modulation coils 8 and the second variable attenuator 10 being provided with a fixed value attenuator 11 having a ratio of 1.84/2.405, said attenuator being switchable into the circuit by means of a switch 12. A second phase-sensitive detector 13 is connected to the low frequency oscillator 9 and to the first phase-sensitive detector 7, the second phase-sensitive detector 13 also being connected to a recorder 14 through a third variable attenuator 15 having a time constant, the circuit between the second phase-sensitive detector 13 and the third variable attenuator 15 being provided with an integrator 16, said integrator being switchable into the circuit by means of a switch 17. From the above construction and arrangement, the produced alternating field modulates the unidirectional field of the magnet, the oscillator 9 produces an amplitude of the modulation field, which is much larger than that individual linewidth of a high resolution nuclear magnetic resonance spectrum and, therefore, causes sideband spectra. The second variable attenuator 10 adapts the amplitude of the modulation field, produced by the modulation coils 8, to the value at which the principal spectrum disappears. Thus, by switching the attenuator 11 having a ratio of 1.84/2.405 into the circuit by means of switch 12, there results a maximum signal to noise ratio of the produced spectrum. The spectrum may be observed directly or recorded, or else imparted to an electronic Hiller integrator which integrates the spectrum. This integration which is necessary to determine the number of nuclei participating in the nuclear induction is known per se; its accuracy is however considerably increased by the modulation sideband method, due to the improved signal/noise ratio. The device developed shows that in the way integrated spectra can easily be obtained with an accuracy of better than 1%.

What is claimed is:

A device for recording high resolution nuclear magnetic resonance spectra by the method of sideband spectrum techniques comprising a magnet for producing a unidirectional magnetic field, a pair of transmitter coils mounted between the poles of the magnet, said coils being connected to a transmitter through a first variable attenuator, a receiver coil mounted between the poles of the magnet, said receiver coil being connected to a receiver, a first phase-sensitive detector connected to the transmitter and to the receiver, a pair of modulation coils mounted between the magnet poles and connected to a low frequency oscillator through a second variable attenuator, a second phase-sensitive detector connected to the oscillator and to the first phase-sensitive detector, a recorder connected to the second phase-sensitive detector through a third variable attenuator having a time constant, an integrator provided in the circuit between the second phase-sensitive detector and the recorder, switch means connected to the circuit between the second phase-sensitive detector and the integrator for switching the integrator into the circuit between the second phase-sensitive detector and the recorder, an attenuator having a fixed value provided in the circuit between the modulation coils and the oscillator, said attenuator having a ratio of 1.84/2.405, and second switch means connected to the circuit between the modulation coils and the fixed value attenuator for switching said attenuator into the circuit between the modulation coils and the oscillator, whereby the produced alternating field modulates the unidirectional field of the magnet, the oscillator produces an amplitude of the modulation field, thereby causing sideband spectra, the second variable attenuator adapts the amplitude of the modulation field to the value at which the principal spectrum disappears, thus, by switching the fixed value attenuator having a ratio of 1.84/2.405 into the circuit between the modulation coils and the oscillator effects a maximum signal/noise ratio of the sideband spectrum.

No references cited.